Dec. 21, 1954 C. M. KINGHORN 2,697,772
METHOD OF MAKING MATERIAL
Filed May 12, 1952
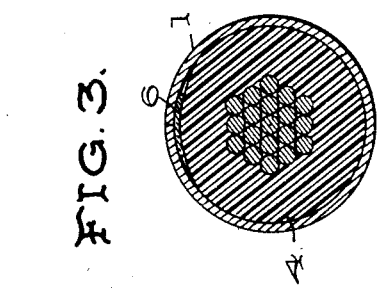
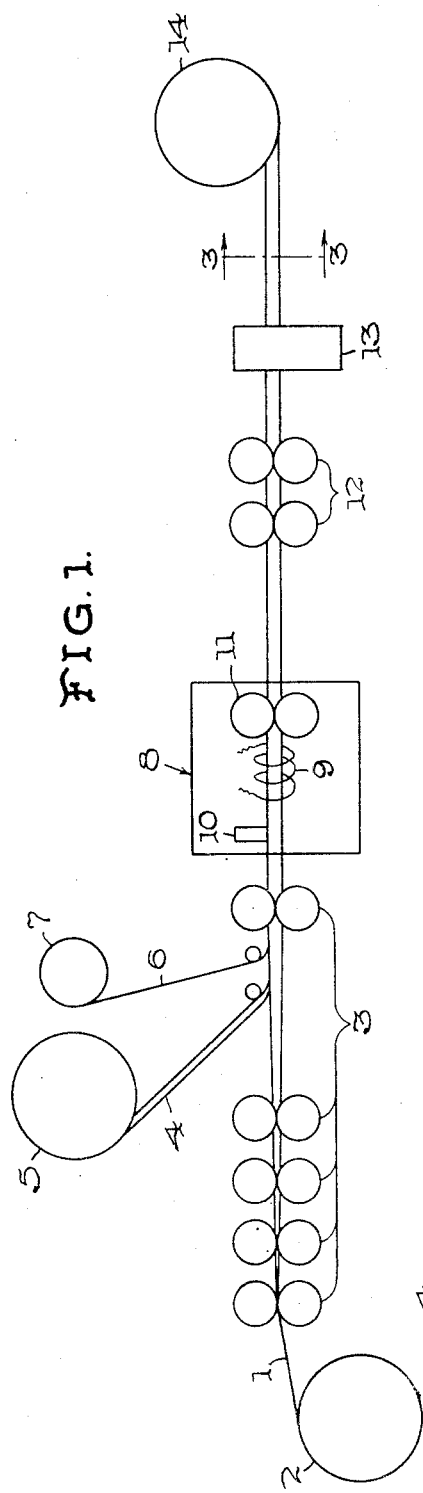
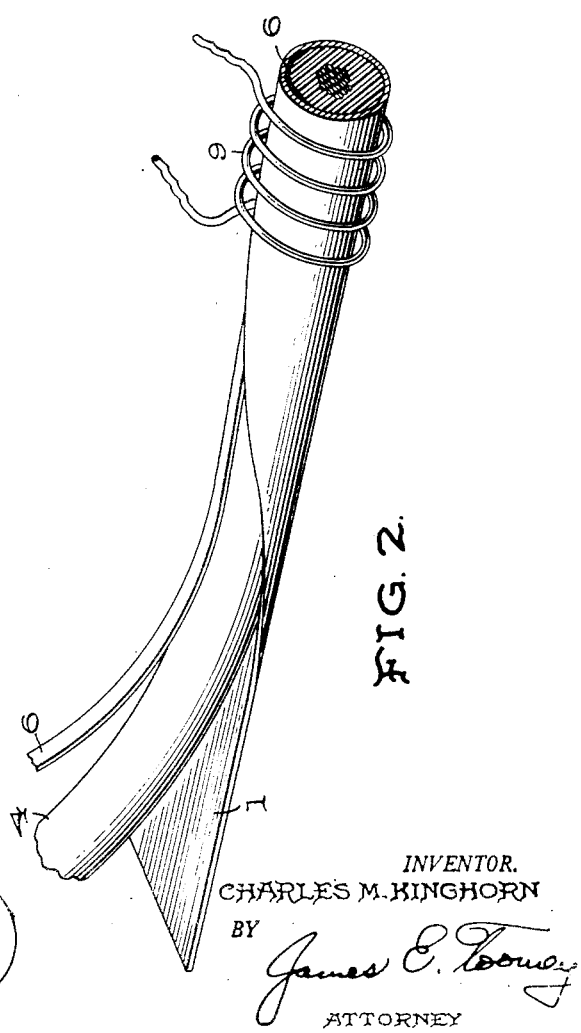
INVENTOR.
CHARLES M. KINGHORN
BY
*James E. Toomey*
ATTORNEY United States Patent Office 2,697,772
Patented Dec. 21, 1954

2,697,772

METHOD OF MAKING MATERIAL

Charles M. Kinghorn, Rye, N. Y., assignor to Kaiser Aluminum & Chemical Corporation, Oakland, Calif., a corporation of Delaware Application May 12, 1952, Serial No. 287,353

10 Claims. (Cl. 219—10)

This invention relates to sheathed cables. More particularly, the invention relates to a process for applying aluminum sheathing to cables.

For a considerable period of time the conventional metal used for the sheathing of cable has been lead. There are, however, certain known disadvantages in the application of this metal as sheathing material. Lead is very heavy, has low tensile strength and elasticity, and has undesirable creep characteristics. Moreover, the cost and availability of lead are not conducive to the use of large quantities of this metal as cable sheathing.

In an attempt to find a material more suitable for cable sheathing than lead, considerable effort has been directed toward the use of aluminum whose corrosion resistance, lightness, and high strength are properties much desired in sheathing material. Various processes for applying aluminum sheathing to cable have been proposed, but for one or more reasons, none of these processes have been completely satisfactory from a commercial standpoint.

The most satisfactory method proposed so far utilizes a welding process commonly known as induction welding. The process generally comprises passing aluminum strip of suitable composition and dimensions continuously through a roll forming machine. Cable is fed into the formed aluminum trough just preceding that stage of roll forming where the edges of the strip are brought substantially together to progressively form open seam tubing. Simultaneously therewith an aluminum foil strip or tape is positioned upon the top of the cable such that it is directly beneath the open seam of the tubing. This strip or tape performs the function of protecting the cable insulation from any tendency toward excessive heat and flash during the subsequent welding of the seam edges. The cable, foil strip or tape, and open seam tubing are then passed through an energized high frequency induction coil wherein the seam edges remain spaced apart during passage through the induction coil such that no, or very little, current passes across the seam. At the exit end of the coil, or just beyond the end, the seam edges are caused to be brought together. Substantially all of the induced current in that portion of the tubing within the coil is caused to concentrate and pass across the seam at the point of edge contact resulting in rapid heating and fusion of the seam edges. Thereafter, the welded tubing assembly can be passed through sizing rolls which give the sheathing a slight reduction in size such that it is in close conformity with the insulated cable without imparting any significant work hardening to the sheathing.

Although the above process has been found to give satisfactory results in producing sheathed cable possessing high strength, flexibility, lightness, and good corrosion resistance without damage to the insulation, it has been found that considerable care must be exercised in the use of the aluminum foil strip or tape as the protective medium for the cable insulation.

In the welding process, it is essential that the passage of current across the open seam of the sheathing be kept at zero or very near thereto in order to produce the proper high current concentration at that point where the spaced seam edges are brought together to cause rapid and complete heating and fusion of the seam edges. Where aluminum foil is used as the protective medium against welding heat and flash, care is necessary to prevent the foil from contacting both sides of the open seam at the same time thereby electrically bridging the seam whereby electrical current passes across the seam. Such a result reduces the concentration of current at the point where the seam edges are normally brought together with a tendency toward improper welding and the necessity of reduced rates of welding. It has been proposed to eliminate any tendency of electrical bridging by roll forming the tubing or sheathing such that the open seam portion is spaced from the cable and foil a sufficient distance. Also it has been proposed to utilize a seam guide, the lower extremity of which will bear down on the strip or tape and cable thereby in effect pushing them away from the open seam. These methods of preventing the occurrence of electrical bridging when using aluminum foil tape require relatively close control of the apparatus. From a commercial standpoint, it is highly desirable that such close control be eliminated.

It is therefore the primary object and purpose of this invention to provide a novel method for applying sheathing to cable which overcomes disadvantages attendant in processes heretofore known.

Another object is to provide a novel process for applying aluminum sheathing to cable which is productive of consistently good results.

A further object is to provide an improved process for sheathing insulated cables with aluminum by induction welding.

A more specific object is to provide an improved process for the induction welding of aluminum sheathing about cable wherein sound welds, high strength and flexibility of the sheathing are attained with no damage to the insulation and with a minimum of control necessary.

It has been discovered according to the present invention that the heretofore known process of applying aluminum sheathing to insulated cable by means of roll forming the sheathing about the cable and thereafter induction welding the opposed seam edges of the sheathing together can be made productive of consistently satisfactory results with less operational difficulties by interposing between the insulated cable and the sheathing a suitable non-conducting, heat and flash resistant protective medium in the form of a strip or tape. The protective strip or tape is progressively fed down upon the top of the cable as the cable is fed into the roll-formed sheathing prior to entrance into the induction coil. Inasmuch as the strip or tape is of non-conducting material, the tendency for electrical bridging of the open seam on the roll-formed sheathing is eliminated thereby insuring constant high current concentration and rapid heating at the point where the seam edges are brought together adjacent the exit end of the induction coil. Moreover, by the use of such non-conductive material the sheathing can be roll-formed into closer conformity with the cable and protective tape without electrical bridging occurring and with the added feature that a minimum reduction in diameter of the sheathing is necessary during the sizing operation.

The invention will now be more fully described with reference to the accompanying drawings which are, however, only to be regarded as illustrating a preferred embodiment and in no way as limiting the scope of the invention.

Figure 1 is a diagrammatic illustration showing a preferred arrangement of apparatus for performing the instant invention.

Figure 2 is a perspective view, with parts removed, showing the feeding of the insulated cable into the trough of the aluminum sheathing as partially formed together with a protective tape and the passage of forward portions of the cable assembly through an induction coil.

Figure 3 is a cross-sectional view of the welded sheathed cable taken along the lines 3—3 of Figure 1.

As can be seen from Figure 1, suitable aluminum sheathing strip material 1 is fed from the coil box 2 through a series of power-driven roll stands 3. The roll stands 3 not only perform the function of forming the strip 1 into tubular shape, but they also act as feed rolls. The roll stands are spaced apart such that at a point during the roll forming of the strip 1 an insulated cable 4 may be fed from a cable reel 5 down between two of the roll stands and positioned in the trough of the partially formed strip. At the same time that cable 4 is being fed into the roll stands, a protective tape 6 is fed off of a reel 7 and placed upon the upper portion of cable 4. This assembly comprising the cable, protective tape, and the partially roll formed sheathing strip is thereafter passed through the remaining roll stands whereby the strip is formed into open seam tubing closely surrounding the insulated cable and with the protective tape disposed directly beneath the open seam. It is contemplated, within the scope of the invention, that prior to feeding the strip 1 into the first roll stand 3 the strip 1 may be passed through suitable edge shears (not shown) in order to properly trim the edges in preparation for the subsequent edge welding operation in those instances where the edges of the coiled strip are unduly rough or uneven. Such an edge shearing operation also may be beneficial in removing objectionable oxide formation.

The protective tape 6 can be made of any suitable material which is non-conducting and heat resistant while being flexible. The function of this tape is to prevent any tendency of electrical bridging occurring across the open seam of the tubing during the subsequent seam welding operation as well as to protect the insulated cable 4 from any possible damage due to excessive heat and flash in the welding zone. As one example, glass tape has been found suitable in performing the required functions noted above. It is contemplated, however, that other non-conducting materials can be used with satisfactory results as, for example, asbestos.

After leaving the roll stands 3 the aluminum sheathed cable assembly then passes into a heating station 8 wherein the two opposed seam edges of the aluminum sheathing are fused together. Thereafter the welded cable assembly is passed through sizing rolls 12 which give the aluminum sheathing a slight reduction in diameter in order to closely conform the sheathing to the insulated cable and then the sheathed cable may be wound on coiling reel 14. Intermediate the coiling reel 14 and the sizing rolls 12 can be provided a suitable automatic cut-off mechanism 13 for cutting off various lengths of sheathed cable or for cutting off the cable at such time as a complete coil has been wound on reel 14.

The heating station 8 generally comprises a conventional high frequency induction heating coil 9 the longitudinal axis of which is parallel to the axis of the sheathed cable assembly passing through the center thereof. The coil may be of hollow copper tubing or other suitable material through which cooling fluid may be circulated. The frequencies employed may vary over a wide range of from 2,000 cycles or less for large cables up to as high as 500,000 cycles per second for very small cables, depending upon factors such as the speed of travel of the cable assembly through the induction coil and the diameter and wall thickness of the roll-formed tubing wherein the smaller the diameter of the tubing the higher must be the frequency to produce a satisfactory weld.

As the two opposed sheathing seam edges of roll-formed strip 1 enter the coil 9, the edges are spaced apart a small but predetermined distance. During progressive movement of the tubing through the cord 9, the spaced seam edges are progressively caused to be forced into contact with each other at a point at or near the outer or right hand end of the coil. The high frequency coil, when energized, sets up an alternating electromagnetic field which in turn causes effective alternating current voltage to be induced in substantially only that portion of the cable sheathing located between the inner and outer ends of the coil. It is known that the strength of the electromagnetic field of a coil drops off very rapidly relatively close to the physical ends of the coil. As mentioned hereinbefore, the seam is held open throughout the major and preferably the entire length of coil 9. Due to the spacing of the opposed seam edges, there will not be a flow of current across the seam edges. When the seam edges are forced into contact at a point at or near to the outer end of the coil 9, current will be caused to flow across the seam at the point of contact. The quantity of current which will be caused to flow across the seam at the point where the edges are forced into contact with each other is directly related to the voltage which has been induced in that portion of the cable sheathing which at that instant is in the electromagnetic field set up by the coil 9. By maintaining the spaced seam edges apart for a distance which will prevent any appreciable arcing, substantially all of the current flow induced in the cable sheathing section within the electromagnetic field of coil 9 at any one instant will be concentrated at the point where the opposed seam edges are brought together, thus giving rise to a very intense heat at this point causing the fusion of the opposed seam edge surfaces together.

While the manner of heating the opposed seam edges is one primarily of resistance type, often times an arc will develop for a relatively short distance before the point where the seam edges are forced together. This arcing does not appreciably heat up the opposed seam edges and furthermore there is a tendency for the slight amount of arcing which may occur to remove any oxide film which may be present on the opposed edge surfaces of the seam edges and thus insure the production of a sound seam freed of impurities.

In order to accurately control the spacing of the opposed seam edges such that they do not contact one another during passage through the coil 9 until they reach the predetermined point of contact at or just beyond the outer end of the coil to insure a concentrated flow of induced current across the seam at this predetermined point, a suitable seam guide 10 and pressure rolls 11 may be provided in the heating station 8. There are various conventional seam guides used in the longitudinal welding of tubing, one of which comprises a vertically and laterally adjustable fin suitably mounted above the open seam and extending downwardly between the opposed seam edges to thereby hold the seam edges apart to prevent arcing therebetween. To provide against any passage of induced current from one seam edge to the other by means of the seam guide or stationary fin, the fin may be composed of metal plates or sheets suitably insulated from one another. This seam guide also functions to prevent any tendency of the roll-formed tubing to turn or twist, thereby properly positioning the open seam for passage into the induction heating coil 9. The seam guide 10 can also be vertically adjusted such that the lower extremity thereof exerts a positive pressure upon the protective tape 6 and the cable 4 to maintain the tape in proper position on the cable beneath the open seam during the welding operation.

Pressure rolls 11, which may be positioned closely adjacent the outer end of coil 9, are provided to exert positive pressure on the sides of the tubing to cause the opposed seam edges to contact one another in the zone of the outer end of the coil. By varying the position and thickness of seam guide 10 and the position and pressure of rolls 11, the spacing and point of contact of the seam edges can be accurately controlled to give the greatest concentration of induced current flow and welding speed for any given set of conditions including the wall thickness and diameter of the sheathing and the frequency of the induction coil and the spacing of the coil from the sheathing.

By the use of high frequency induction heating of the seam edges of the aluminum sheathing the heating is one of a very localized character. Only a very narrow longitudinal portion of the sheathing will be heated and this portion is confined primarily to the area of the opposed seam edges. Since substantially all of the heating occurs along the seam edges of the sheathing, the main body of the sheathing will not be subjected to any appreciable heating such that the insulation surrounding the conductor will be damaged. Moreover, since the non-conducting, heat resistant protective tape positioned on the cable bridges the seam, that portion of the insulation below the tape will not be damaged by the heat generated in the weld zone or by any welding flash which might form on the inside surface of the sheathing. By means of this form of heating and the use of the protective tape, aluminum sheathed cable may be satisfactorily produced at speeds of sixty feet per minute or more. It has been found that the overall heat rise in the sheathing does not exceed about 200° F. which is well below the permissible 400° F. which the conventional insulation will withstand without damage.

The wall thicknesses of the aluminum sheathing which may be rapidly and satisfactorily welded by means of the invention may cover a wide range by proper selection of the frequency and the welding speed although the generally preferred range varies from about .032 inch to about .064 inch depending on the diameter of the cable to be sheathed.

After the welded aluminum sheathed cable passes through the heating station 8, it is progressively fed through suitable sizing rolls 12 and wound on cable reel 14. The pressure rolls 12 may include one or more roll stands each comprising a plurality of rolls surrounding the circumference of the sheathing. The amount of reduction of the sheathing needed to provide it with the necessary close conformity with the cable 4 is dependent upon the diameter and clearance of the sheathing in the welded condition with respect to the cable. It is generally found desirable to roll form the sheathing strip stock 1 into tubing having a diameter closely approximating that of the cable 4 in order that only a slight reduction be necessary in the sizing operation. By doing this, the amount of work hardening imparted to the aluminum sheathing will be reduced to a minimum thereby greatly facilitating the ability to handle and use the sheathed cable without the danger of rupturing the sheathing.

Depending upon the condition of the seam edges of the aluminum sheathing strip stock relative to oxide formation, it is contemplated, within the scope of the invention, to subject that area of the opposed seam edges of the sheathing within the heating zone produced by the induction coil 9 to the action of a suitable stream of an inert gas such as helium or argon. By means of this shielding atmosphere, any tendency of the sheathing to be subject to oxide formation in the heated condition, particularly with regard to the seam edges which are to be fused together, is reduced to a minimum.

The process of the invention is eminently suited to the production of aluminum sheathed cable using "2S" or commercially pure aluminum although other aluminum alloys may be used in the process with satisfactory results. For general purpose application it has been found generally desirable to utilize annealed aluminum coiled strip stock for the sheathing such that the formed and welded sheathing will be relatively soft and easily formed and handled without the tendency to rupture thereby admitting moisture within the sheathing. In certain instances, however, it may be desirable to utilize tempered aluminum strip stock for the sheathing.

Although the preferred embodiment of the invention set forth hereinbefore does not include the use of a cooling chamber through which the progressively welded sheathing may pass prior to entry into the sizing rolls, it may in certain cases be desirable to increase the rate of heat extraction from the welded zone by this means. When utilizing "2S" or other high purity aluminum as the material for the sheathing, the use of such a cooling chamber will not affect the properties of the metal inasmuch as these metals are not susceptible to heat treatment.

By means of the instant invention, it is possible to satisfactorily weld aluminum sheathed cable at speeds commercially applied to the welding of tubes made from various metals and yet produce a sound seam weld without damage to the insulation on the cable. The exterior surface of the resulting sheathing will be perfectly smooth and comparable to the surface of seamless extruded or drawn tubing. The aluminum sheathed cable of the invention also possesses the desirable characteristics of resistance to corrosion, high strength, and flexibility without rupture.

Although an advantageous embodiment of the invention has been herein illustrated and described, it will be understood that various changes may be made therein without departing from the true spirit and scope thereof as defined by the appended claims.

What is claimed is:

1. In a process for applying aluminum sheathing to insulated cable wherein aluminum strip material is progressively roll-formed into open seam tubing, cable is progressively fed into said formed tubing, the cable and surrounding open seam tubing are passed through a high frequency induction coil, and the seam edges of the tubiing being brought together at a point adjacent the exit end of said coil to cause high current concentration and fusion of said edges together, the improvement which comprises progressively feeding a non-conducting protective tape onto said cable as it is being fed into said tubing such that said protective tape is positioned between said open seam and said cable whereby said cable is protected from the heat and flash produced during welding.

2. A process according to claim 1 wherein said protective tape is composed of glass.

3. A process according to claim 1 wherein said protective tape is composed of asbestos.

4. In a process for applying aluminum sheathing to insulated cable wherein cable and closely surrounding open seam aluminum tubing are progressively passed through a high frequency alternating current electromagnetic field to induce current into said tubing, said seam edges are progressively brought into contact with each other at a point such that substantially all of the induced current in that portion of said tubing within the electromagnetic field is caused to concentrate and flow across said point of edge contact to rapidly heat and weld said edges together, and thereafter said tubing is subjected to a reduction in size to closely conform the tubing to said cable, the improvement comprising interposing between said cable and said open seam tubing a non-conducting, heat resistant protective tape, said protective tape being positioned such that it bridges said open seam in the tubing whereby the insulation around the cable will not be damaged by heat and flash produced during welding of the seam edges together.

5. In a process for continuously applying aluminum sheathing to insulated cable wherein aluminum strip material is progressively roll-formed into open seam tubing, cable is progressively fed into said formed tubing, the cable and surrounding open seam tubing are passed through a high frequency alternating electromagnetic field, the seam edges are progressively brought together at a point adjacent the end of said electromagnetic field to cause substantially all of the induced current in that portion of said tubing within said field to concentrate and flow across said point of edge contact to rapidly heat and weld said edges together, and said welded tubing is closely conformed to said cable, the improvement comprising progressively disposing protective glass tape upon said insulated cable such that said tape directly underlies the open seam of said tubing and bridges said open seam in said tubing whereby electrical bridging of said open seam is prevented and the cable insulation is protected against damage from welding heat and flash.

6. A process for continuously applying a protective aluminum sheathing to an insulated cable comprising the steps of progressively shaping a continuously moving strip of aluminum into an open seamed protective tubing, progressively and continuously feeding an insulated cable into said open seamed tubing, progressively and continuously depositing a strip of non-conductive tape directly upon said insulated cable immediately adjacent the open seam in said tubing so that said tape underlies said seam in said tubing, thereafter while passing said tubing together with the cable and tape enclosed therein through a high frequency alternating current electromagnetic field, progressively and continuously drawing the seam edges of said tubing toward one another in such a manner that the seam edges of said tubing will be brought into surface contact with each other at a point closely adjacent the exit end of the electromagnetic field and thereafter causing substantially all the induced current in that portion of the tubing located within the said electromagnetic field to concentrate and flow across the point of surface contact between the seam edges of the tubing so as to effectively heat and weld said seam edges together and preventing damage to the insulated portion of said cable during said welding operation by shielding the insulated portion of said cable with said non-conductive tape.

7. A process for continuously applying a protective aluminum sheathing to an insulated conductor comprising the steps of progressively shaping a moving strip of aluminum into an open seamed protective tubing, progressively and continuously feeding an insulated conductor into said open seamed tubing, progressively and continuously depositing a strip of tape of a non-conductive material directly upon the insulated conductor and immediately adjacent the open seam in said tubing so that the said tape will directly underlie the said seam in said tubing, thereafter while passing said tubing together with the conductor and the tape enclosed therein through a high frequency alternating current electromagnetic field, and while preventing electrical bridging of said open seam in said tubing progressively and continuously drawing the seam edges of said tubing toward one another in such a manner that the said seam edges will be brought into surface contact with each other at a point adjacent the exit end of said electromagnetic field, and thereafter at the time said seam edges are brought into surface contact with each other, causing substantially all of the current induced in the tubing by said electromagnetic field to concentrate and flow across the point of surface contact between the seam edges of the tubing adjacent the exit end of said electromagnetic field so as to effectively weld the seam edges of the tubing together and thereby close the tubing about the insulated conductor.

8. A process for continuously applying a protective aluminum sheathing to an insulated conductor comprising the steps of progressively shaping a moving strip of aluminum into an open seamed protective tubing, progressively and continuously feeding an insulated conductor into said open seam tubing, progressively and continuously depositing a strip of tape of a non-conductive material directly upon the insulated conductor immediately adjacent the open seam in said tubing so that the said tape will directly underlie the said seam in the tubing, thereafter while passing said tubing together with the conductor and the tape enclosed therein through an electromagnetic field produced by a high frequency alternating current, progressively and continuously drawing the seam edges of said tubing toward one another in such a manner that the said seam edges will be brought together at a point of travel adjacent the exit end of said electromagnetic field, and eliminating electrical bridging of said open seam in said tubing until said point of travel is reached and thereafter causing substantially all of the current induced in the tubing by said electromagnetic field to concentrate and flow across the point of surface contact between the same edges of the tubing adjacent the exit end of said electromagnetic field so as to effectively weld the seam edges of the tubing and thereby close the tubing about the insulated conductor while shielding the insulation on the conductor from welding heat and flash.

9. A process for continuously applying a protective aluminum sheathing to an insulated conductor comprising the steps of progressively shaping a moving strip of aluminum into an open seamed protective tubing, progressively and continuously feeding an insulated conductor into said open seam tubing, progressively and continuously depositing a strip of tape of a non-conductive material directly upon the insulated conductor immediately adjacent the open seam in said tubing so that the said tape will directly underlie said seam and said tubing, thereafter while passing said tubing together with the conductor and the tape enclosed therein through an electromagnetic field produced by a high frequency alternating current, progressively and continuously drawing the seam edges of said tubing toward one another in such a manner that the said seam edges will be brought into surface contact with each other at a point of travel adjacent the exit end of said electromagnetic field while eliminating electrical bridging of said open seam in said tubing until said point of travel is reached, and thereafter causing substantially all of the current induced in the tubing by said electromagnetic field to concentrate and flow across the point of surface contact between the seam edges of the tubing adjacent the exit end of said electromagnetic field so as to effectively weld the seam edges of the tubing and close the tubing about the insulated conductor while shielding the insulation on said conductor from welding heat and flash, and finally pressing said tubing closely against said insulated conductor.

10. A process for continuously applying a protected aluminum sheathing to an insulated cable comprising the steps of progressively shaping a continuously moving strip of aluminum into an open seamed protective tubing, progressively and continuously feeding an insulated cable into said open seamed tubing, progressively and continuously depositing a strip of non-conductive tape directly upon said insulated cable immediately adjacent the open seam in said tubing so that said tape underlies said seam in said tubing, thereafter while passing said tubing together with the cable and tape enclosed therein through a high frequency alternating current electromagnetic field produced by induction coil means progressively and continuously drawing the seam edges of said tubing toward one another in such a manner that the seam edges of said tubing will be brought into surface contact with each other at a point beyond the exit end of the induction coil means and within said electromagnetic field and thereafter causing substantially all of the induced current in that portion of the tubing located within the said electromagnetic field to concentrate and flow across the point of surface contact between the seam edges of the tubing so as to effectively heat and weld said seam edges together and preventing damage to the insulated portion of said cable during said welding operation by shielding the insulated portion of said cable with said non-conductive tape.

References Cited in the file of this patent

UNITED STATES PATENTS

| Number | Name | Date |
|---|---|---|
| 692,012 | Heyldia | Jan. 28, 1902 |
| 2,029,044 | Westlinning | Jan. 28, 1936 |
| 2,063,470 | Staples | Dec. 8, 1936 |
| 2,088,446 | Specht | July 27, 1937 |
| 2,146,430 | Hagen | Feb. 7, 1939 |
| 2,165,310 | Spaeth | July 11, 1939 |
| 2,210,338 | Quarnstrom | Aug. 6, 1940 |
| 2,243,979 | Reynolds | June 3, 1941 |
| 2,508,465 | Offinger | May 23, 1950 |

FOREIGN PATENTS

| Number | Country | Date |
|---|---|---|
| 377,655 | Great Britain | Jan. 21, 1931 |
| 952,419 | France | May 2, 1949 |